United States Patent
Mogilevski

(10) Patent No.: US 8,503,195 B1
(45) Date of Patent: Aug. 6, 2013

(54) SYSTEM AND METHOD FOR ZERO VOLT SWITCHING OF HALF BRIDGE CONVERTERS DURING STARTUP AND SHORT CIRCUIT CONDITIONS

(75) Inventor: Igor Mogilevski, Northridge, CA (US)

(73) Assignee: Power-One, Inc., Camarillo, CA (US)

( * ) Notice: Subject to any disclaimer, the term of this patent is extended or adjusted under 35 U.S.C. 154(b) by 363 days.

(21) Appl. No.: 12/905,699

(22) Filed: Oct. 15, 2010

Related U.S. Application Data

(60) Provisional application No. 61/252,072, filed on Oct. 15, 2009.

(51) Int. Cl.
*H02M 3/335* (2006.01)
*H02H 7/122* (2006.01)

(52) U.S. Cl.
USPC ..................... 363/21.03; 363/56.03

(58) Field of Classification Search
USPC ................. 363/21.02, 21.03, 56.03
See application file for complete search history.

(56) References Cited

U.S. PATENT DOCUMENTS

| | | | |
|---|---|---|---|
| 5,325,283 A | | 6/1994 | Farrington et al. |
| 5,638,260 A | * | 6/1997 | Bees ............................... 363/17 |
| 6,343,025 B1 | * | 1/2002 | Nagahara ....................... 363/49 |
| 6,396,252 B1 | | 5/2002 | Culpepper et al. |
| 6,836,414 B1 | | 12/2004 | Batarseh et al. |
| 7,098,642 B2 | | 8/2006 | Lipcsei et al. |
| 2004/0212356 A1 | * | 10/2004 | Dowlatabadi ................. 323/282 |
| 2006/0221528 A1 | * | 10/2006 | Li et al. .......................... 361/100 |
| 2007/0013349 A1 | | 1/2007 | Bassett |
| 2007/0018619 A1 | * | 1/2007 | Endo .............................. 323/224 |
| 2008/0106243 A1 | | 5/2008 | Cheon et al. |

\* cited by examiner

*Primary Examiner* — Adolf Berhane
*Assistant Examiner* — Emily Pham
(74) *Attorney, Agent, or Firm* — Waddey & Patterson, P.C.; Mark J. Patterson; Gary L. Montle

(57) ABSTRACT

An open loop half-bridge power converter is provided for effective zero volt switching during all operating conditions, the converter including: an oscillating inverter circuit having a pair of switches coupled to a load circuit; an inverter drive circuit effective to provide driver signals to the inverter circuit; and a control circuit for providing control signals to the drive circuit. The control circuit is configured to increase a switching frequency of the switching devices in response to a predetermined condition such as startup or short circuit conditions. The inverter as a result continues to operate at a full duty cycle in response to the increased switching frequency, and zero volt switching is ensured throughout the duration of the predetermined condition.

12 Claims, 3 Drawing Sheets

SYSTEM AND METHOD FOR ZERO VOLT SWITCHING OF HALF BRIDGE CONVERTERS DURING STARTUP AND SHORT CIRCUIT CONDITIONS

CROSS-REFERENCES TO RELATED APPLICATIONS

This application claims benefit of the following patent application(s) which is/are hereby incorporated by reference: U.S. Provisional Patent Application No. 61/252,072, filed on Oct. 15, 2009.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to switching power converters. More particularly, the present invention relates to providing an open loop half-bridge converter with improved switching frequency control. Even more particularly, the present invention relates to an improved half-bridge converter control method for use in a switch mode power supply.

Power systems that use intermediate bus architecture have in recent years become a desirable solution as opposed to more traditional centralized power supplies or distributed converters in isolation. Intermediate bus architecture generally offers greater power quality at a lower cost due in part to use of highly efficient and power-dense unregulated intermediate bus converters. These converters generate intermediate bus voltages in an acceptable range for delivery to local point-of-load (POL) regulators.

Designers have conventionally resisted variable frequency control schemes for switch-mode converters as fundamentally undesirable with respect to constant-frequency control, having more difficult implementation in addition to potential electromagnetic interference. This is particularly true for steady-state operation, which has conventionally had the primary attention of the designers rather than irregular operations that are associated with startup or short circuit conditions.

As such, various topologies have been designed to implement soft switching and constant-frequency control. Soft switching, or more specifically zero voltage switching in the context of this application, relates to providing a driver signal that turns on each switch in an oscillating inverter when the voltage waveform across the switch drops to zero, thus eliminating or minimizing associated switching losses.

Conventional switch-mode bus converters as known in the art commonly use an open-loop, half-bridge topology operating at full duty cycle. During startup and short circuit conditions a pulse width modulator symmetrically reduces the pulse width to each inverter switch while maintaining a constant switching frequency to reduce energy in the primary switches and the transformer. However, during these conditions the half-bridge converter is operating in what is known in the art as a hard switching mode, where the switches are not turned on in accordance with zero volt switching. Due to the hard switching during startup and short circuit conditions, energy recovery snubber circuits are frequently used to protect the switching components and reduce parasitic ringing that would otherwise occur. The losses which are dissipated in these snubbers may be prohibitive, particularly at high switching frequencies.

In other half-bridge topologies an asymmetrical duty cycle has been used to prevent switching losses. This also does not provide optimal efficiency, as such a system may for example have undesired circulating currents during the off time of the PWM or require larger duty cycle ranges.

These conventional techniques are particularly unsuitable with respect to intermediate bus architecture converters, which require high efficiency and flexibility and are located within a limited physical area.

There is a need for a half-bridge converter that ensures zero-volt switching during all operating conditions to eliminate the use of snubbers and unstable operation that is inherent to hard switching during startup and short circuit conditions.

Further, there is a need for a converter topology that reduces energy in the primary switches and transformer without reducing the pulse width of the driving signals to the inverter.

BRIEF SUMMARY OF THE INVENTION

In accordance with various aspects of the present invention, a system and method for zero-volt switching of a half-bridge converter during startup and short circuit conditions is provided.

A modular power supply implements a novel bus converter topology that combines desirable aspects of both resonant and constant-frequency switching mode control and thereby ensures zero-volt switching during all operating conditions. During steady-state operation the converter operates at a fixed frequency and full duty cycle. During startup and short circuit conditions the converter gradually adjusts the switching frequency between a nominal (steady-state) operating frequency of about 130 kHz and a maximum operating frequency of about 500 kHz, rather than maintaining a fixed frequency and reducing the pulse width of the output signal to the inverter driver. Under startup and short circuit conditions the duty cycle remains at full duty cycle, thereby ensuring proper zero-volt switching operation.

Under short circuit conditions, the converter may enter a pulse skipping mode to reduce the energy in the transformer and power switches but even during this mode zero-volt switching is maintained.

Briefly stated, in an embodiment an open loop half-bridge power converter is provided for effective zero volt switching during all operating conditions. The converter includes an oscillating inverter circuit having a pair of switches coupled to a load circuit, an inverter drive circuit effective to provide driver signals to the inverter circuit and a control circuit for providing control signals to the drive circuit. The control circuit is configured to increase a switching frequency of the switching devices in response to a predetermined condition, such as for example startup or short circuit conditions. The inverter as a result continues to operate at a full duty cycle in conjunction with the increased switching frequency, and zero volt switching continues throughout the duration of the predetermined condition.

In another embodiment of the present invention, a power converter includes a pair of switching devices arranged in a half-bridge configuration between positive and negative converter input terminals. A load circuit is coupled to an output terminal between the pair of switching devices, with a resonant circuit coupled to the pair of switching devices and the load circuit. A detection circuit is coupled to the switching devices and detects a predetermined operating condition of the pair of switching devices. A switching device driver circuit provides driver signals and control oscillation of each of the pair of switching devices in response to control signals provided from a control circuit. The control circuit is configured to provide control signals associated with a variable operating frequency in a first operating mode associated with detection of the predetermined operating condition by the detection circuit, and to provide control signals associated with a fixed operating frequency in a second operating mode. Zero-volt switching of the pair of switching devices is maintained during both of the first and second operating modes.

In another embodiment of the present invention, a method is provided of ensuring zero-volt switching in an open loop half-bridge power converter having an inverter with a pair of oscillating switches, the method including the steps of detecting in a microcontroller the existence of a predetermined operating condition such as startup or short circuit operating conditions, providing control signals in response to the condition from the microcontroller to a switch driver, providing driver signals to the inverter switches effective to gradually increase a switching frequency of the inverter switches to a predetermined maximum frequency during the condition, the driver signals maintaining a constant pulse width; and providing driver signals to the inverter switches effective to gradually reduce the switching frequency of the inverter switches to a nominal operating frequency upon elapsing of the condition.

DETAILED DESCRIPTION OF THE INVENTION

Figure 1:
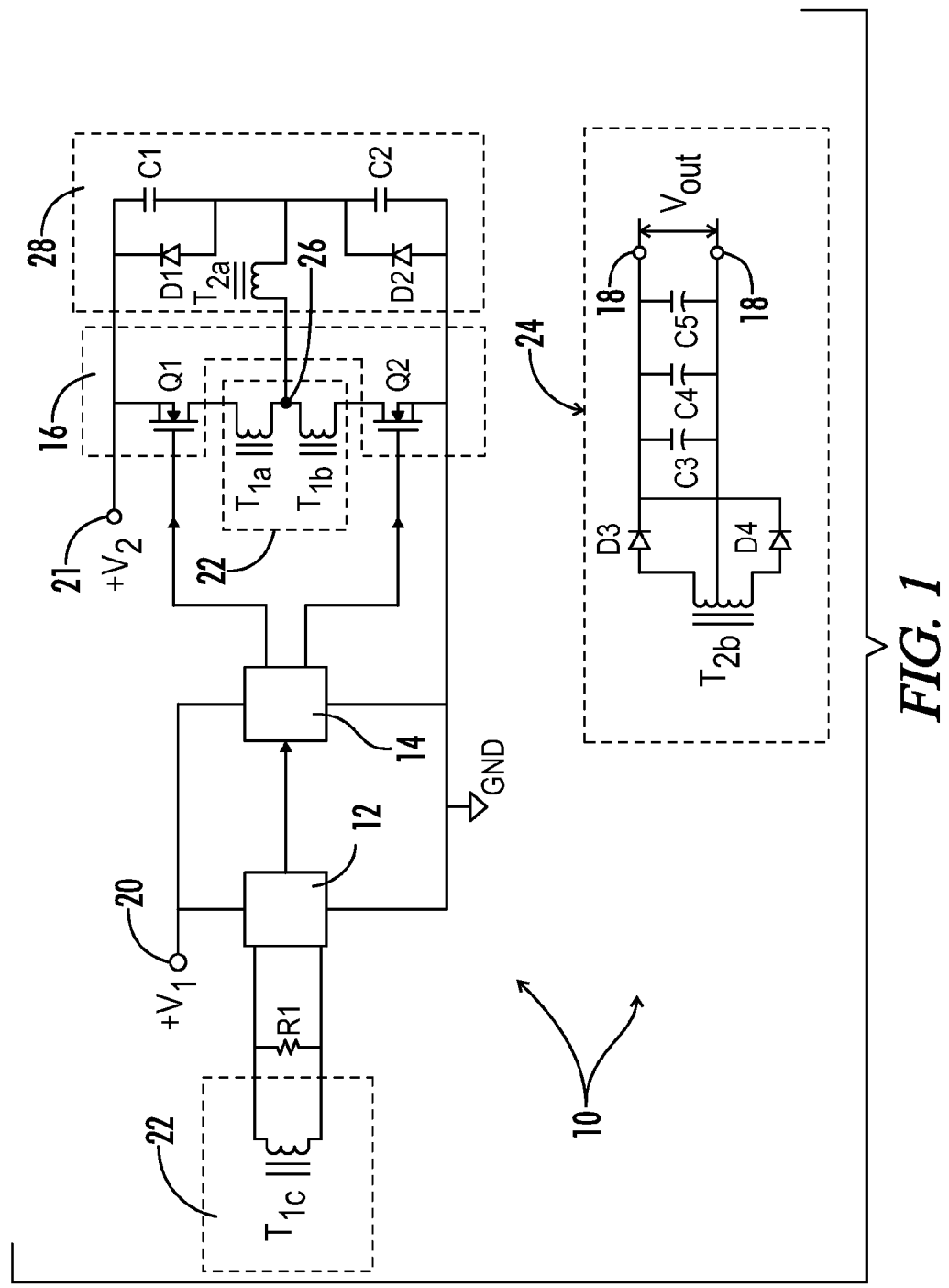
FIG. 1 is a circuit diagram showing an embodiment of a half-bridge converter of the present invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The term "signal" means at least one current, voltage, charge, temperature, data or other signal.

The terms "switching element" and "switch" may be used interchangeably and may refer herein to at least: a variety of transistors as known in the art (including but not limited to FET, BJT, IGBT, IGFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The term "controller" as used herein may refer to at least a general microprocessor, an application specific integrated circuit (ASIC), a digital signal processor (DSP), a microcontroller, a field programmable gate array, or various alternative blocks of discrete circuitry as known in the art, designed to perform functions as further defined herein.

Referring generally to FIGS. 1-4, an open loop half-bridge power conversion system and method is provided for maintaining zero-volt switching during all operating conditions. Where the various figures may describe embodiments sharing various common elements and features with other embodiments, similar elements and features are given the same reference numerals and redundant description thereof may be omitted below.

Referring generally to FIG. 1, a power converter 10 includes a controller 12, an inverter driver 14, an oscillating inverter 16, a resonant signal detection circuit 22, and output terminals 18 for providing output power to an external load. The controller 12 is coupled to a first positive input terminal 20 wherein a first input voltage V1 is provided with respect to a negative input terminal GND to power the controller 12 specifically. This input voltage V1 is typically about 12 volts, but may vary depending on the specifications of the controller 12.

The controller 12 in various embodiments as shown may be a high performance resonant mode microprocessor 12 capable of providing pulse output signals to the inverter driver 14. The inverter driver 14 in an embodiment as shown is a half-bridge driver integrated circuit capable of providing gate drive signals to the oscillating inverter 16 in response to pulse signals received from the controller 12. The controller 12 and the inverter driver 14 may alternatively be embodied within the scope of the present invention in discrete analog circuitry rather than microprocessors or integrated circuits. Further, it is anticipated within the scope of the present invention that the controller 12 and the inverter driver 14 may be collectively embodied in a single microprocessor or IC.

The oscillating inverter 16 includes two switching elements Q1, Q2 in a half-bridge configuration as is well known in the art. The inverter 16 is coupled between a second positive input terminal 21 and the negative input terminal GND, whereby a higher voltage V2 (e.g., 360V) may be provided. The switching elements Q1, Q2 turn on and off in an alternating fashion in accordance with a switching frequency determined by the gate drive signals being delivered from the inverter driver 14. The switching elements Q1, Q2 operate at full duty cycle.

The external load may be a single load, or in embodiments as shown the converter 10 may be for example an intermediate bus converter 10 wherein the output power delivered from the inverter 16 to the output terminal 18 is subsequently delivered to one or more external loads with respect to the converter 10, such as for example point-of-load (POL) regulators.

In an embodiment as shown in FIG. 1 the one or more loads may be coupled to a load circuit 24 which includes the secondary winding T2b of a load transformer T2 having a primary winding T2a further coupled to the inverter 16. The load transformer T2 provides galvanic isolation between the output terminal 18 and therefore output power Vout provided to the one or more loads, and the inverter 16. A magnetizing inductance of the primary winding T2a in conjunction with capacitors C1, C2 further defines a resonant circuit 28.

The load circuit 24 may further be defined to include an output stage 24 of the converter 10 having a capacitor-loaded center tapped half-bridge rectifier (T2b, D3, D4, C3, C4, C5).

The converter 10 is configured and programmed in accordance with various embodiments of the present invention to operate in a manner which ensures zero volt switching (ZVS) of the switching elements Q1, Q2 during all operating conditions. Zero volt switching as used herein may generally refer to an operation of turning on each switch Q1, Q2 in turn with substantially zero volts present across the switch Q1, Q2, as is generally known in the art.

Figure 2:
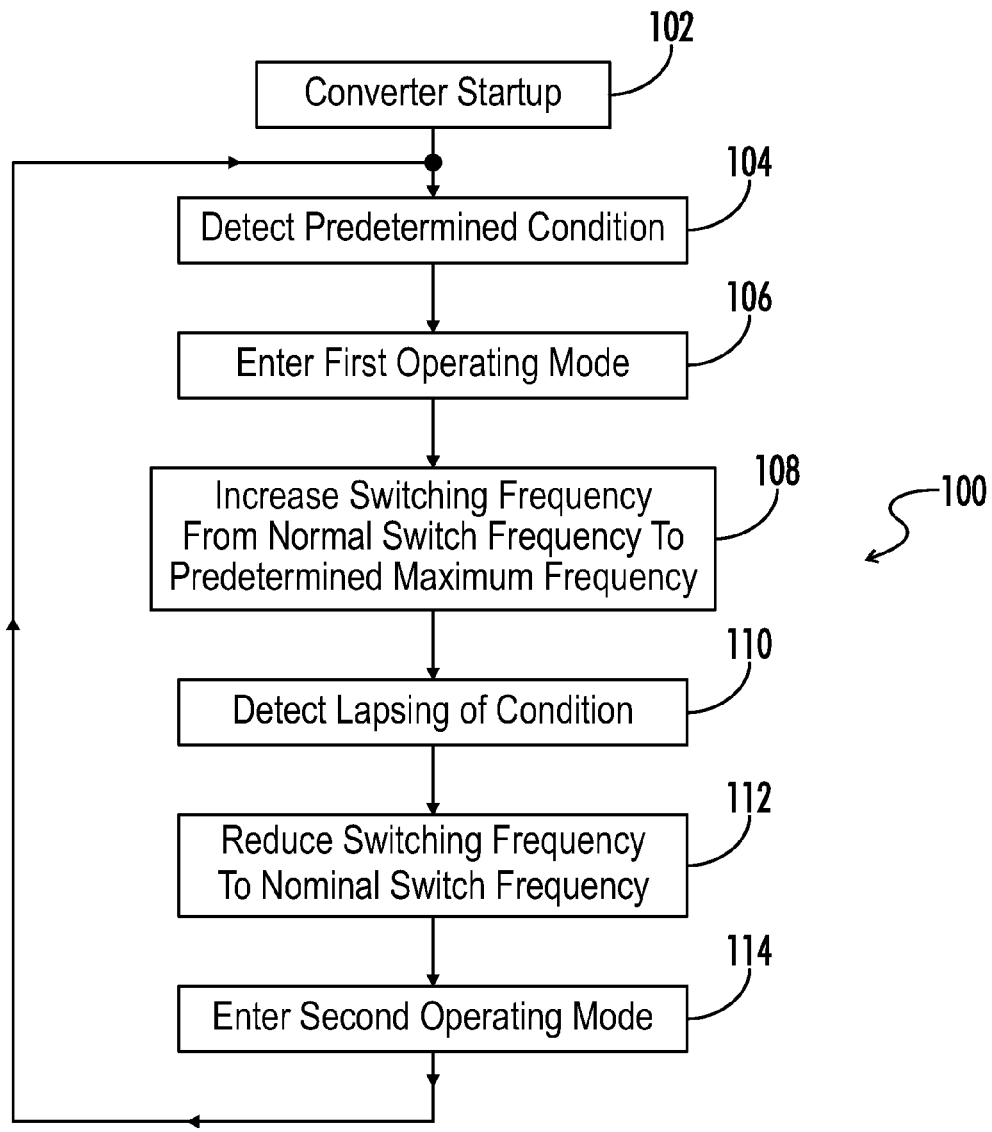
FIG. 2 is a flowchart showing an embodiment of a method of operation for the power converter of the present invention.

Referring to FIG. 2, an embodiment of a method of operation 100 for an open loop half bridge resonant converter 10 of the present invention may herein be described.

After converter startup or otherwise initiation of an input voltage V1 to the converter 10 (step 102), the controller 12 may be programmed to detect the presence of a predetermined condition such as for example a soft start condition (step 104). In various embodiments, the converter 10 may determine the presence of the predetermined condition by receiving an input signal from the detection circuit 22 and comparing the result with a predetermined threshold or an internal reference signal which may for example be provided from an external source within the scope of the present invention. Where the predetermined condition includes short circuit conditions, a sudden drop in output voltage from the converter 10 may therefore be detected by the detection circuit 22. Where the predetermined condition further or alternatively includes soft start conditions, the lack of an output voltage from the converter 10 upon initial startup of the converter 10 may further be detected by the detection circuit 22. In various embodiments the converter 10 may alternatively or additionally determine the presence of the predetermined condition in response to a failure or adjustment in the input voltage V1 received from the first input terminal 20.

The detection circuit 22 in an embodiment as shown in FIG. 1 includes a transformer T1 having a first winding T1a coupled to the emitter of switching element Q1, and a second winding T1b coupled to the collector of switching element Q2, with the windings T1a, T1b both coupled to a node which may further be defined as an output terminal for the inverter circuit 16, and to which the load circuit 24 may for example be coupled via the isolation transformer T2. The detection circuit 22 further includes a third winding T1c which is coupled to the controller 12 to provide a detection signal indicative of for example a current through the resonant inductor L2a and/or an output from the switching elements Q1, Q2 of the inverter circuit 16, whereby for example zero volt switching operations for the inverter circuit 16 may be provided and maintained.

Upon detecting a predetermined condition, the controller 12 then enters a first operating mode (step 106) associated with the predetermined condition. Rather than maintaining a fixed frequency and modulating the pulse width of the pulse output signals to the driver 14, the controller modulates the switching frequency and maintains the pulse width of the signals throughout the duration of the predetermined condition (step 108). The switching frequency in the first operating mode may in various embodiments be increased gradually to a predetermined maximum frequency such as for example 500 kHz, or other frequency as may be defined by component values in the converter 10. While in this example the frequency is adjusted in response to a soft start condition, the same operation by the controller 12 may further be carried out for other user-defined predetermined conditions representing a non-steady state condition where the pulse width would otherwise be reduced by various controllers as previously known in the art.

The controller 12 may be programmed to maintain the predetermined maximum switching frequency until having determined that the predetermined condition has lapsed (step 110). This may be determined for example by internally clocking the condition for a predetermined time associated with the condition. Where the predetermined condition which triggered the first operating mode was a short circuit condition however, in various embodiments the controller 12 may be programmed to maintain the first operating mode until for example a detection signal from the detection circuit 22 indicates the short circuit condition is no longer present.

After lapsing of the predetermined condition, the controller 12 responds (step 112) by gradually reducing the switching frequency of the switching elements Q1, Q2 to a nominal frequency, such as for example 130 kHz. The controller 12 then enters a second operating mode (step 114) associated with steady state operation of the converter 10. During the second operating mode the switching frequency is maintained at the fixed nominal frequency. The method 100 then returns to step 104 and monitors operation of the converter 10 for another predetermined condition.

During both of the first and second operating modes, the duty cycle of the switching elements Q1, Q2 remains at full duty cycle to better ensure zero volt switching operations.

In various embodiments it may be desirable to further reduce energy losses in certain components in response to for example a short circuit condition. The first operating mode for the converter 10 in these embodiments may further include a pulse skipping mode. In a pulse skipping mode as known in the art, the controller 12 may skip pulses and thereby prevent the switching devices Q1, Q2 from turning on during the duration of the pulse skipping mode, which may be for example a predetermined time period or as determined by an external trigger, or for one or more predetermined time periods as determined by the continued existence of the short circuit condition.

However, even in the various embodiments utilizing pulse skipping it may be understood that zero volt switching is maintained for the switching elements Q1, Q2.

Figure 3:
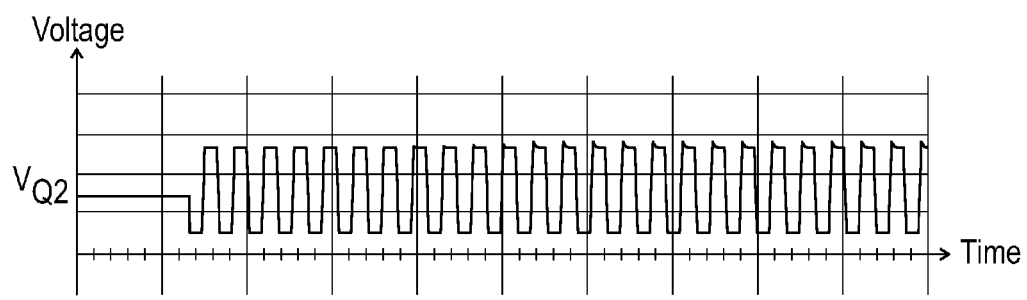
FIG. 3 is a graphical display showing a waveform of the drain to source voltage on a switching element during a soft start condition, with a switching frequency of 569 kHz.
Figure 4:
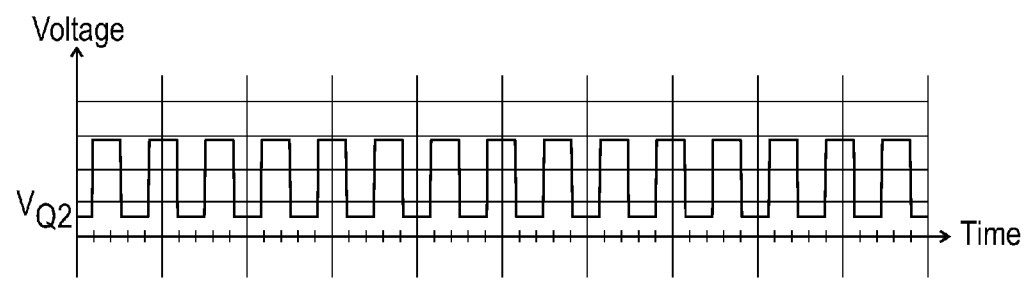
FIG. 4 is a graphical display showing a waveform of the drain to source voltage on a switching element at the conclusion of a soft start condition, with a switching frequency of 151 kHz.

Referring now generally to FIGS. 3-4, various waveforms are displayed in accordance with an embodiment of operation of a converter 10 as shown in FIG. 1. FIG. 3 demonstrates the drain to source voltage $V_{Q2}$ across switching element Q2 at the predetermined maximum switching frequency (here about 569 kHz) during a soft start condition. FIG. 4 demonstrates the drain to source voltage $V_{Q2}$ across the switching element Q2 at the end of the same soft start cycle, with the switching frequency having been reduced to a nominal level (here about 151 kHz). Note that the duty cycle remains at full duty cycle with respect to either frequency.

The previous detailed description has been provided for the purposes of illustration and description. Thus, although there have been described particular embodiments of the present invention of a new and useful "System and Method for Zero-Volt Switching of Half Bridge Converter During Startup and Short Circuit Conditions," it is not intended that such references be construed as limitations upon the scope of this invention except as set forth in the following claims.

What is claimed is:

1. A power converter comprising:
   an oscillating open loop half-bridge inverter circuit further comprising a plurality of switching devices coupled to a load circuit;
   an inverter drive circuit effective to provide driver signals to the inverter circuit; and
   a control circuit for providing control pulses to the drive circuit, the control circuit configured to
   detect the presence of a predetermined condition,
   in conjunction with a normal operation of the converter, to maintain a nominal switching frequency of the switching devices,
   in conjunction with an operation associated with the predetermined condition, to adjust the switching frequency between the nominal frequency and a predetermined condition operating frequency, and
   in each operation of the converter, to maintain a constant pulse width, a full duty cycle, and zero-volt switching for the switching devices.

2. The converter of claim 1, the control circuit configured to gradually increase the switching frequency from a nominal operating frequency to a maximum operating frequency in response to the predetermined condition.

3. The converter of claim 2, the nominal operating frequency being approximately 130 kHz, the maximum operating frequency further being approximately 500 kHz.

4. The converter of claim 1, the predetermined condition comprising a short circuit condition.

5. The converter of claim 4, the control circuit further effective to enter a pulse skipping mode in response to the short circuit condition, wherein zero-volt switching is further maintained during the short circuit condition.

6. The converter of claim 1, the predetermined condition comprising a startup condition.

7. A power converter comprising:
   a pair of switching devices arranged in a half bridge configuration between positive and negative converter input terminals;
   a load circuit coupled to an output terminal between the pair of switching devices;
   a resonant circuit coupled to the pair of switching devices and the load circuit;
   a detection circuit coupled to the switching devices and configured to detect a predetermined operating condition of the pair of switching devices; and
   a switching device driver circuit effective to provide driver signals and control oscillation of each of the pair of switching devices in response to control signals provided from an open loop control circuit,
   wherein the control circuit is configured
   to provide control signals associated with a variable operating frequency in a first operating mode associated with detection of the predetermined operating condition by the detection circuit, and
   to provide control signals associated with a fixed operating frequency in a second operating mode,
   wherein a full duty cycle and zero volt switching of the pair of switching devices is maintained during both of the first and second operating modes, and a constant pulse width for the driver signals is maintained during both of the first and second operating modes.

8. The power converter of claim 7, the predetermined operating condition further comprising a short circuit condition.

9. The power converter of claim 8, the control circuit further effective to enter a pulse skipping operating mode in response to detection of the short circuit condition, wherein zero-volt switching is further maintained during the short circuit condition.

10. The power converter of claim 7, the predetermined operating condition further comprising a soft start condition.

11. The power converter of claim 7, wherein the variable operating frequency in the first operating mode ranges from the fixed operating frequency associated with the second operating mode to a maximum operating frequency.

12. A method of maintaining zero-volt switching in an open loop half-bridge power converter having an inverter circuit with a pair of oscillating switches, the method comprising:
   detecting in a microcontroller an input signal having a value representative of an operating condition of the power converter;
   comparing the input signal value to a predetermined threshold value;
   providing control signals from the microcontroller to a switch driver, the driver signals maintaining a constant pulse width and a constant duty cycle throughout operation of the converter; and
   providing driver signals to the inverter switches responsive to the control signals, wherein
   in a first mode associated with the input signal value being above the threshold, a switching frequency of the oscillating switches is fixed, and
   in a second mode associated with the input signal value being less than the threshold, the switching frequency of the switches is variable between the fixed frequency and a maximum frequency.

* * * * *